(12) United States Patent
Cho

(10) Patent No.: US 11,523,708 B2
(45) Date of Patent: Dec. 13, 2022

(54) PORTABLE ROASTER WITH IMPROVED PORTABILITY AND HANDLEABILITY

(71) Applicant: Hee La Cha, Paju-si (KR)

(72) Inventor: Tae Sik Cho, Paju-si (KR)

(73) Assignee: Hee La Cha, Paju-si (KR)

( * ) Notice: Subject to any disclaimer, the term of this patent is extended or adjusted under 35 U.S.C. 154(b) by 124 days.

(21) Appl. No.: 17/177,375

(22) Filed: Feb. 17, 2021

(65) Prior Publication Data

US 2021/0330121 A1    Oct. 28, 2021

(30) Foreign Application Priority Data

Apr. 22, 2020   (KR) .......................... 10-2020-0048431

(51) Int. Cl.

| | |
|---|---|
| *F24C 3/14* | (2021.01) |
| *A47J 37/07* | (2006.01) |
| *A47J 37/06* | (2006.01) |
| *F24C 15/00* | (2006.01) |
| *F24C 15/10* | (2006.01) |
| *F24C 15/36* | (2006.01) |

(52) U.S. Cl.
CPC ......... *A47J 37/0704* (2013.01); *A47J 37/067* (2013.01); *F24C 3/14* (2013.01); *F24C 15/004* (2013.01); *F24C 15/107* (2013.01); *F24C 15/36* (2013.01)

(58) Field of Classification Search
USPC ....................................................... 126/9 R
See application file for complete search history.

(56) References Cited

U.S. PATENT DOCUMENTS

| | | | | |
|---|---|---|---|---|
| 2,477,529 | A * | 7/1949 | Sprinkle | A47J 37/0763 99/450 |
| 2,577,963 | A * | 12/1951 | Hagopian | A47J 37/04 126/14 |
| 3,667,446 | A * | 6/1972 | Morton | A47J 37/07 126/250 |
| 6,191,572 | B1 * | 2/2001 | Fowler | G01R 31/2887 324/754.13 |
| 6,591,828 | B1 * | 7/2003 | Schneider | F24B 1/205 126/9 B |

(Continued)

FOREIGN PATENT DOCUMENTS

| | | |
|---|---|---|
| KR | 20-1992-0004732 U | 3/1992 |
| KR | 20-0359427 Y1 | 8/2004 |

(Continued)

*Primary Examiner* — Steven B McAllister
*Assistant Examiner* — John E Bargero
(74) *Attorney, Agent, or Firm* — Korus Patent, LLC; Seong Il Jeong

(57) ABSTRACT

Disclosed herein is a portable roaster used when outdoor cooking or camping is enjoyed. The portable roaster with improved portability and handleability can be changed into a single briefcase form so that it is easy for the user to carry it, can accommodate a windshield, a vertical transfer part, a charcoal plate, and a grill inside the body of the portable roaster so that meat can be grilled and eaten by, e.g., a barbecue grilling method outdoors through easy assembly, it is convenient to store portable roaster in a vehicle or warehouse, and the handling of the portable roaster is very convenient, and allows a cover to be used as a substitute for a table so that the portable roaster is highly versatile.

2 Claims, 16 Drawing Sheets

(56) References Cited

U.S. PATENT DOCUMENTS 6,708,604 B1 * 3/2004 Deichler, Jr. ....... A47J 37/0763
99/449
2016/0367077 A1 12/2016 Dulles

FOREIGN PATENT DOCUMENTS

| KR | 20-0431786 Y1 | 11/2006 |
| KR | 10-0866157 B1 | 10/2008 |
| KR | 20-2013-0005589 U | 9/2013 |

* cited by examiner

FRONT SURFACE

REAR SURFACE

PORTABLE ROASTER WITH IMPROVED PORTABILITY AND HANDLEABILITY

CROSS-REFERENCE TO RELATED APPLICATION

This application claims the benefit of Korean Patent Application No. 10-2020-0048431 filed on Apr. 22, 2020, which is hereby incorporated by reference herein in its entirety.

BACKGROUND

1. Technical Field

The present invention relates generally to a portable roaster used when outdoor cooking or camping is enjoyed, and more particularly to a portable roaster with improved portability and handleability, which can be transformed into a single briefcase form so that it is easy for the user to carry it, which can accommodate a windshield, a vertical transfer part, a charcoal plate, and a grill inside the body of the portable roaster so that meat can be grilled and eaten by, e.g., a barbecue grilling method outdoors through easy assembly, it is convenient to store portable roaster in a vehicle or warehouse, and the handling of the portable roaster is very convenient, and which allows a cover to be used as a substitute for a table so that the portable roaster is highly versatile.

In this case, the charcoal plate of the portable roaster can be transferred up and down by a user's operation, and thus the height of the charcoal plate can be adjusted so that meat is prevented from being burned.

2. Description of the Related Art

In order to cook outdoors such as in camping, a number of separate members such as a barbecue barrel, a grill plate, and a windshield are required.

These various members need to be packed in a box or the like in the trunk of a vehicle when a user moves to an outdoor area, so that cumbersome storage is required. Furthermore, they are individually handled and placed anywhere, so that a disadvantage arises in that they are not easy to manage.

In addition, a problem occurs in that the members are lost while being handled in separate forms.

In addition, in the case of a conventional fixed-type roaster (barbecue barrel), when charcoal is contained, the appropriate distance from flames (heat) cannot be adjusted and grilling is performed only by direct heat, thereby causing a problem in which meat is burned quickly.

Charcoal grilling, stone grilling, or barbecue grilling are typical recipes that can remove fat. These recipes are not only able to remove grease from a target roasted material, but also have the deodorizing effect of removing fishy odor, so they are particularly used to cook meat with a high-fat content and a lot of fishy smell, such as beef or pork.

Among them, charcoal grilling is in the spotlight because it is easy to cook, and charcoal-grilled meat can be fumigated with the unique aroma of charcoal to enhance a user's appetite. For this reason, grill-type roasters that can be used on top of a charcoal furnace are widely distributed and used in restaurants.

However, the conventional roasting table described above must be used in a pair with a charcoal furnace, and thus it is considerably cumbersome to store and carry it, so that it is not suitable for use at home or outdoors.

Accordingly, Korean Utility Model Registration No. 20-0431786 (registered on Nov. 17, 2006) discloses a roaster in which a furnace in which ignition coal is placed is formed, a grill plate is seated in or on the furnace, and food such as meat can be roasted and eaten.

However, the technology disclosed in the aforementioned prior document also still does not overcome the problem of having difficulty in carrying a roaster.

SUMMARY

The present invention has been conceived to overcome the above-described problems, and an object of the present invention is to provide a portable roaster with improved portability and handleability, which can be transformed into a single briefcase form so that it is easy for the user to carry it, which can accommodate a windshield, a vertical transfer part, a charcoal plate, and a grill inside the body of the portable roaster so that meat can be grilled and eaten by, e.g., a barbecue grilling method outdoors through easy assembly, it is convenient to store portable roaster in a vehicle or warehouse, and the handling of the portable roaster is very convenient, and which allows a cover to be used as a substitute for a table so that the portable roaster is highly versatile.

In order to accomplish the above object, the present invention provides a portable roaster with improved portability and handleability, the portable roaster including: a body configured such that a body portion having an open top and an inner space is formed therein, front end portions are provided at open ends of the body portion, and a handle is provided on one side of the outer surface of the body portion; a windshield configured such that front end members are provided on the bottom thereof so that the windshield is located on the front end portions of the body, a folding windshield body that is foldable by hinges is formed, vertical guide slits are formed in one side of the folding windshield body, grill guide grooves are formed on top of the folding windshield body, and one or more fixing holes are formed in one side of the folding windshield body; a vertical transfer part configured such that a transfer body is disposed on the front end member of the windshield, one or more guides protrude from one side surface of the transfer body and are inserted into the vertical guide slits of the folding windshield body, a chain sprocket module configured to transfer the guides vertically is disposed on an inside of the transfer body, and the chain sprocket module is operated by a rotation handle provided on a side surface of the transfer body opposite the one side surface from which the guides protrude; a charcoal plate configured to be located on the guides of the vertical transfer part; a grill configured to be inserted into the grill guide grooves of the windshield and to be transferred a lateral direction; and a cover configured such that a cover body one side of which fasteners are formed to be fitted into the fixing holes of the windshield and folding legs are formed on a bottom surface of the cover body.

In this case, fixing screw portions protrude from surfaces of the front end portions, screw holes are formed in the front end members to receive the fixing screw portions and then the fixing screw portions are fastened in the screw holes by nuts, and a magnet is formed on one side of the windshield and then the nuts are attached thereto.

A drip tray is disposed under the grill, and includes a frame provided under the grill and a plurality of concave reception members provided inside the frame.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
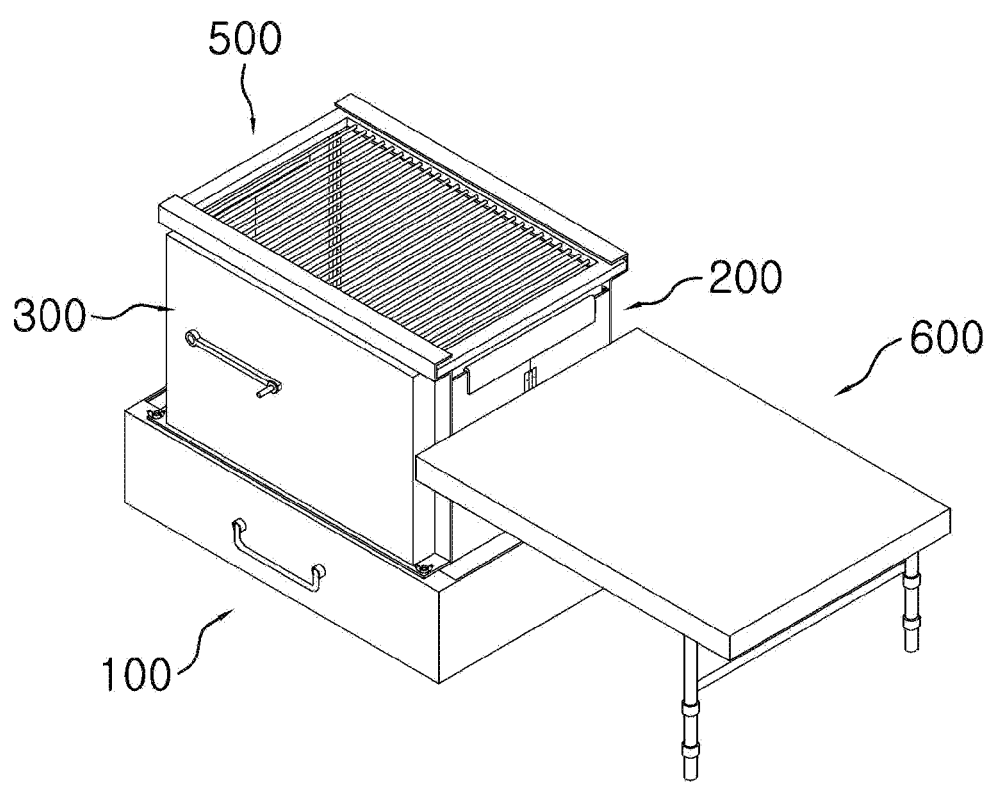
FIG. 1 is a view showing an example of the overall appearance of a portable roaster with improved handleability according to the present invention.

First, the present invention includes a body 100, a windshield 200, a vertical transfer part 300, a charcoal plate 400, a grill 500, and a cover 600, as shown in FIGS. 1 to 16 have.

Figure 2:
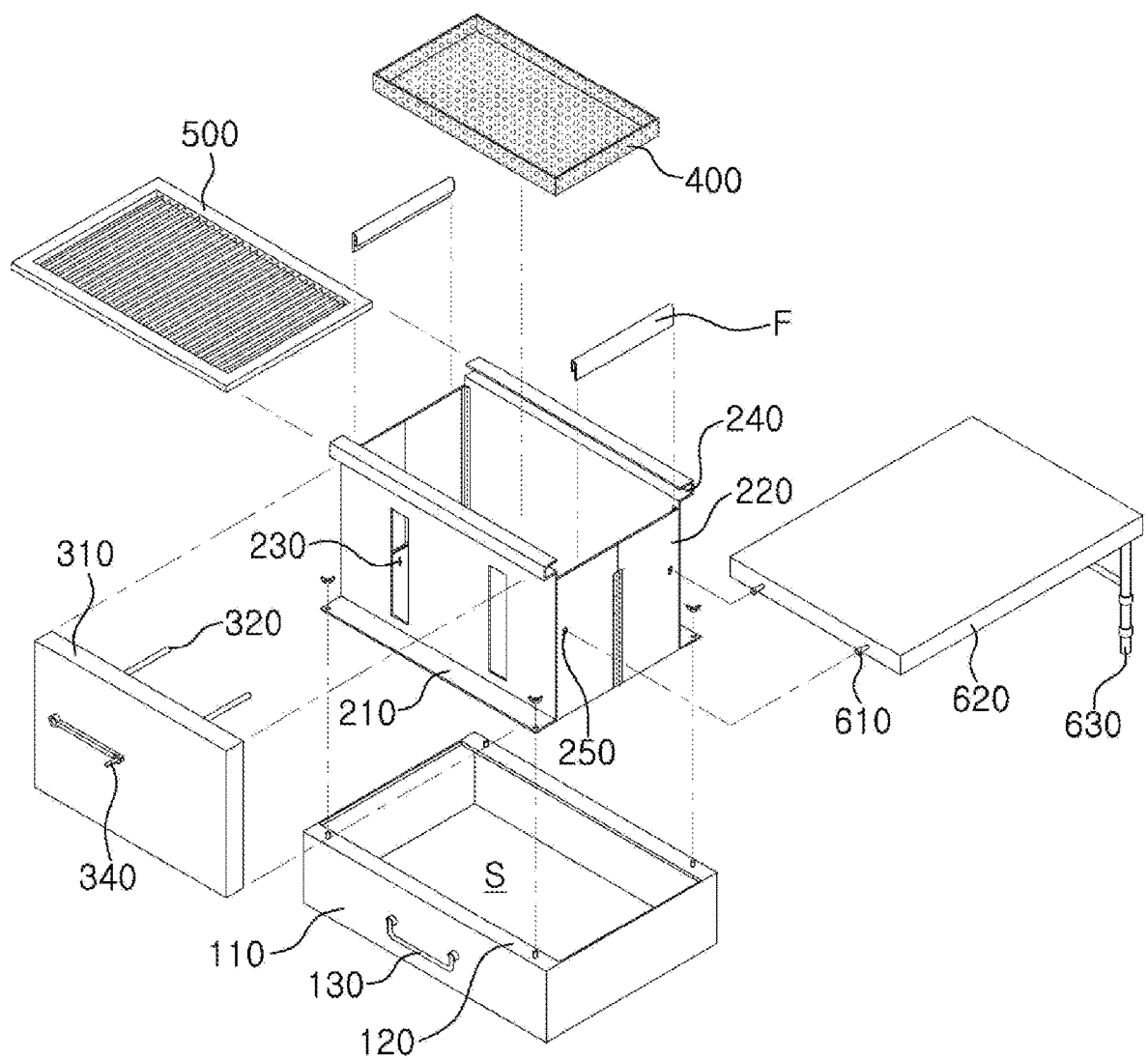
FIG. 2 is an exploded perspective view of FIG. 1 according to the present invention.

Accordingly, as shown in FIGS. 1 and 2, a body portion 110 which has an open top and an inner space S is formed in the body 100, front end portions 120 are provided at the open ends of the body portion 110, and a handle 130 is provided on one side of the outer surface of the body part 110.

Accordingly, the windshield 200 is provided with front end members 210 on the bottom thereof to be located on the end portions 120 of the body 100, a folding windshield body 220 configured to be folded by hinges is provided, vertical guide slits 230 are formed in one side of the folding windshield body 220, grill guide grooves 240 are formed on the top of the folding windshield body 220, and fixing holes 250 are formed in one side of the folding windshield body.

Figure 3:
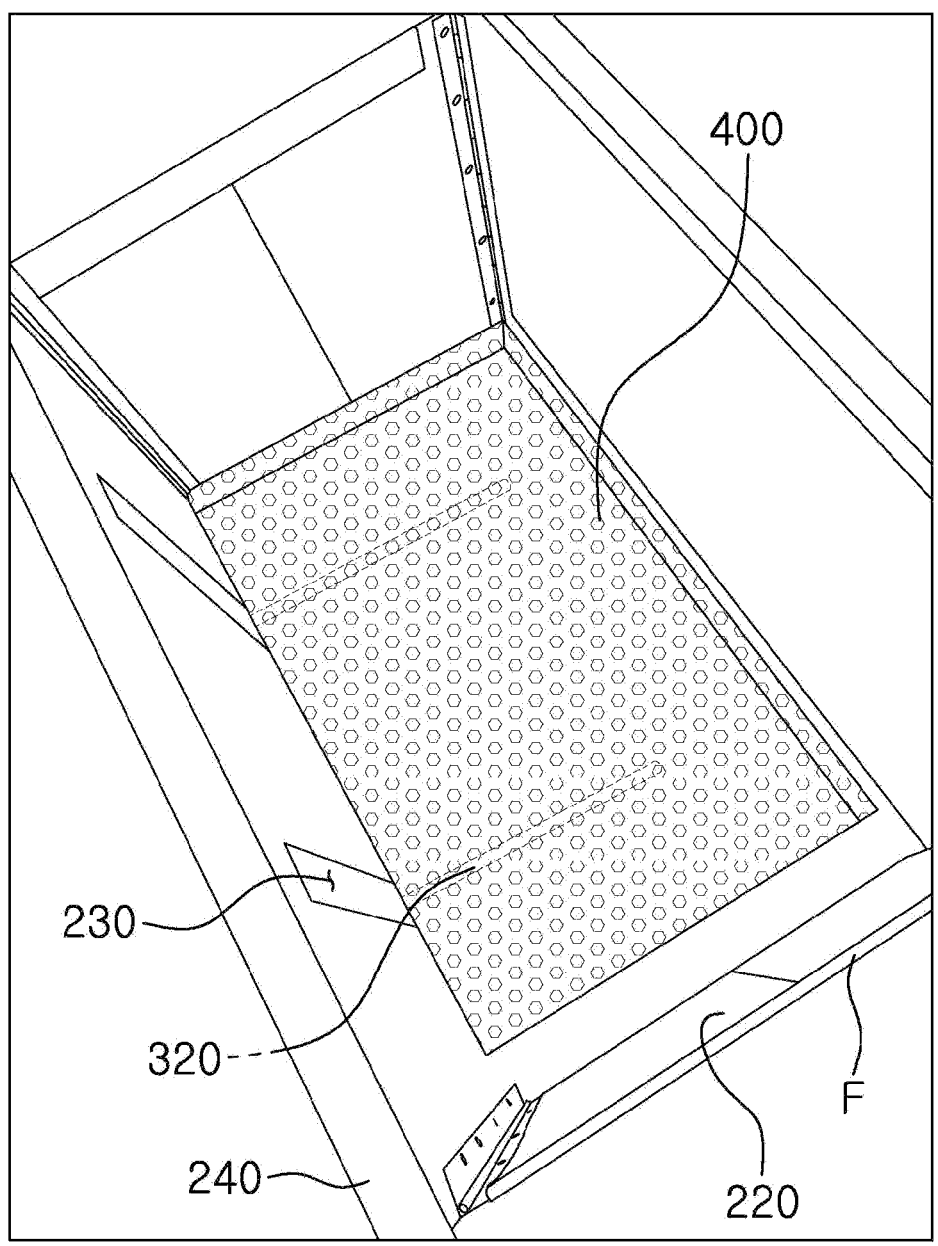
FIGS. 3 to 5 are views showing an example of an operation in which a charcoal plate according to the present invention is selectively lifted and lowered by guides.
Figure 4:
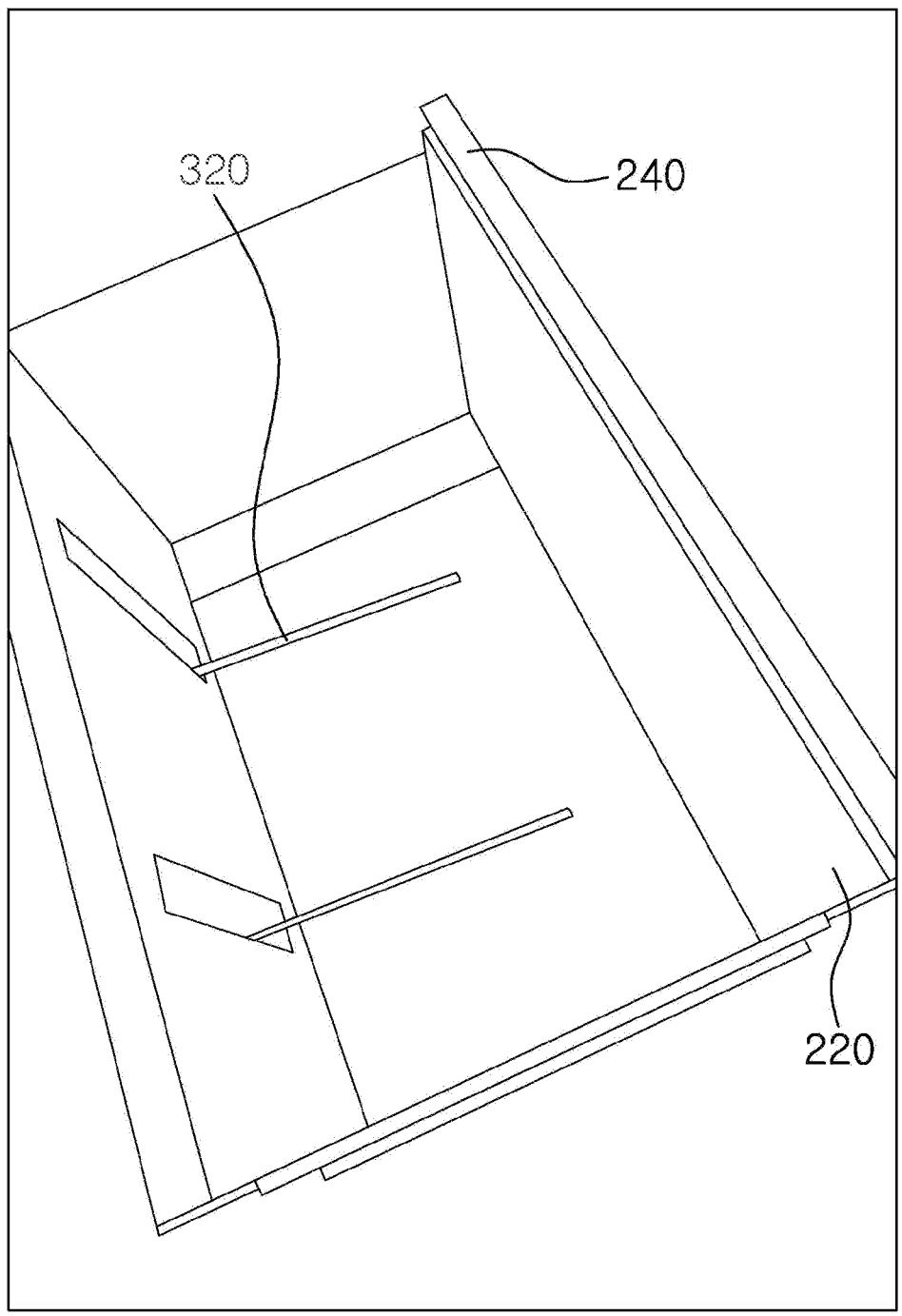

In this case, as shown in FIGS. 2 to 4, the folding windshield body 220 is folded by the hinges in the direction perpendicular to a folding direction. Folding prevention elements F having a "n"-shaped cross-section are fitted over the folding portions of the folding windshield body 220 in order to prevent the folding portions from being folded in the longitudinal direction.

In this case, fixing screw portions 121 protrude from the surfaces of the front end portions 120, screw holes 211 are formed in the front end members 210 to receive the fixing screw portions, and the fixing screw portions 121 are fastened in the screw holes 211 by nuts N.

Accordingly, the nuts N may be provided in various forms such as butterfly nuts, pentagonal nuts, and hexagonal nuts.

A magnet M may be formed on one side of the windshield 200, and the nuts N may be attached thereto.

Figure 5:
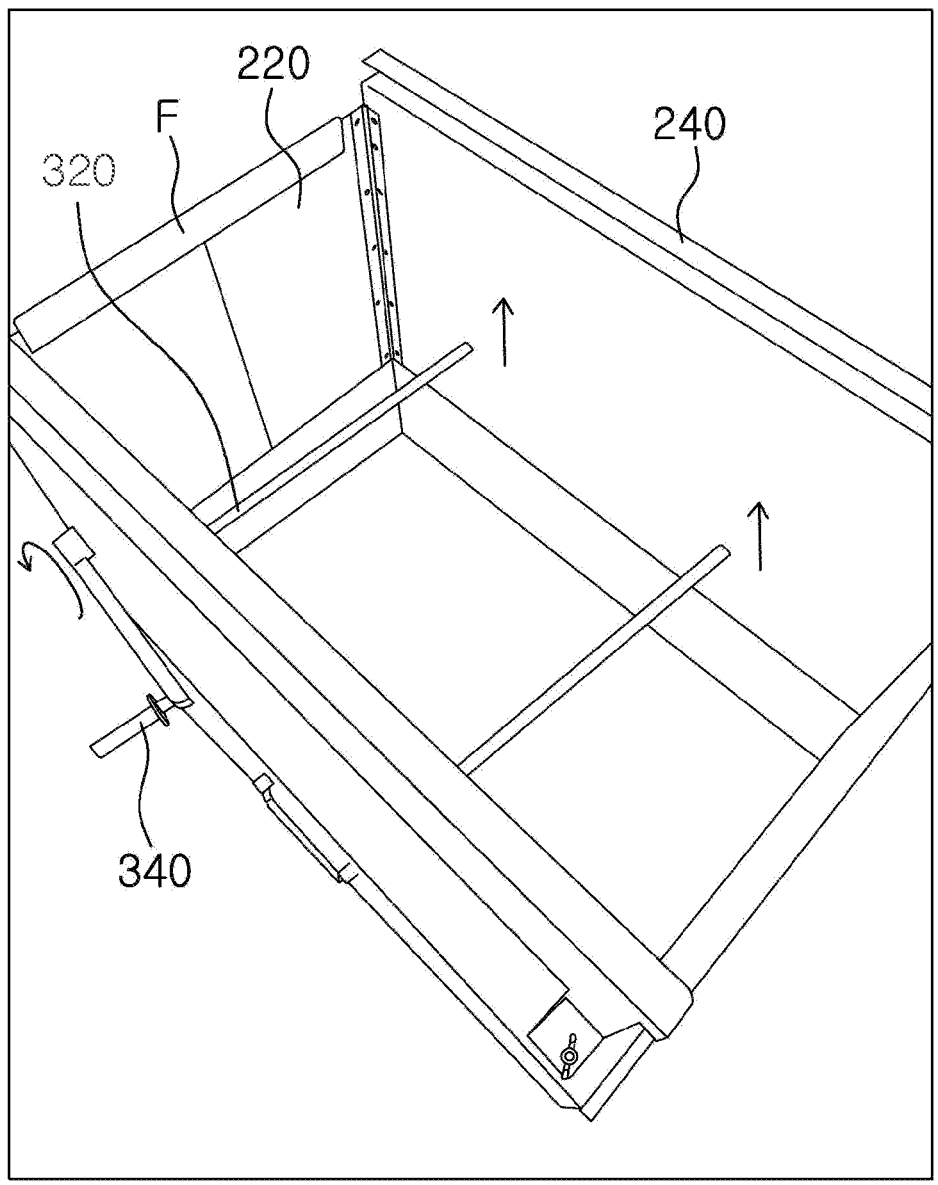

Accordingly, as shown in FIGS. 3 to 5, a transfer body 310 is formed on the front end member 210 of the windshield 200 of the vertical transfer part 300, guides 320 protrude from one side of the transfer body 310 and inserted into the vertical guide slits 230 of the folding body 220, and a chain sprocket module 330 configured to transfer the guides 320 up and down is provided on the inside of the transfer body 310 and is operated by a rotation handle 340 provided on the other side of the transfer body 310 from which the guides 320 protrude.

Figure 6:
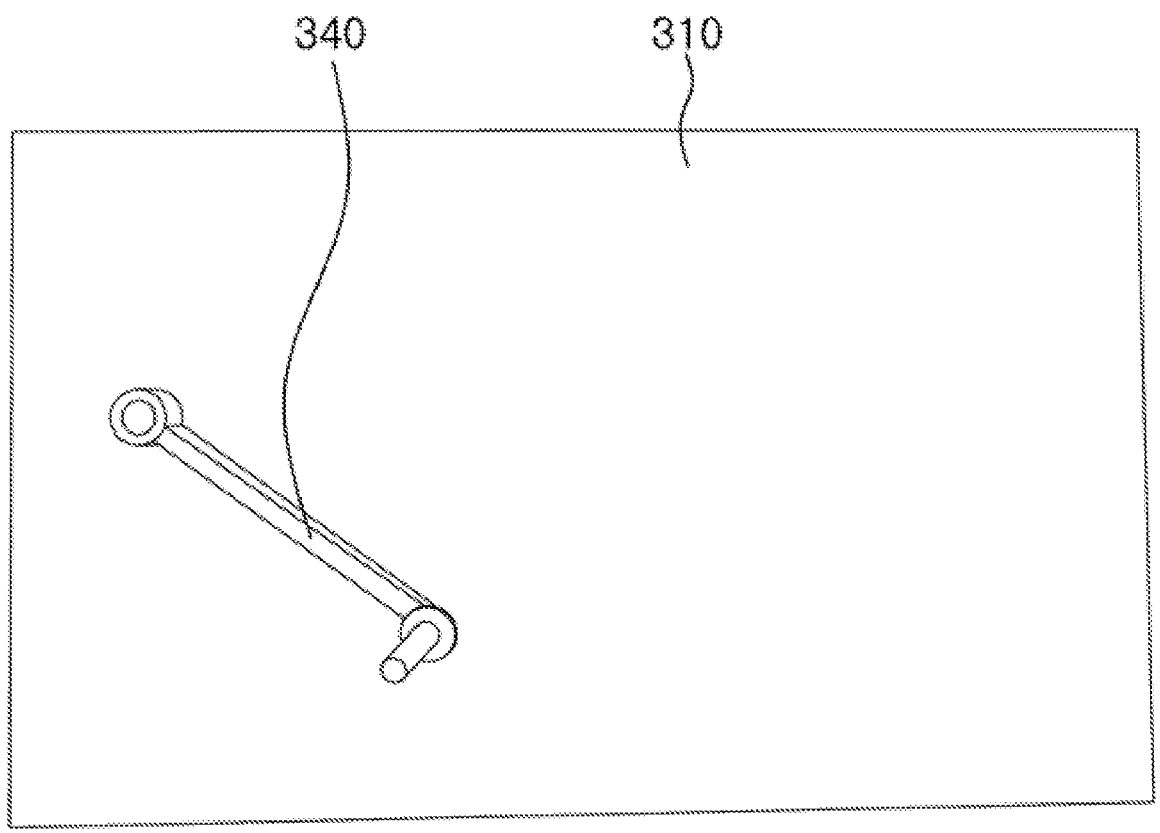
FIGS. 6 and 7 are views showing the front and rear surfaces of a vertical transfer portion according to the present invention.
Figure 7:
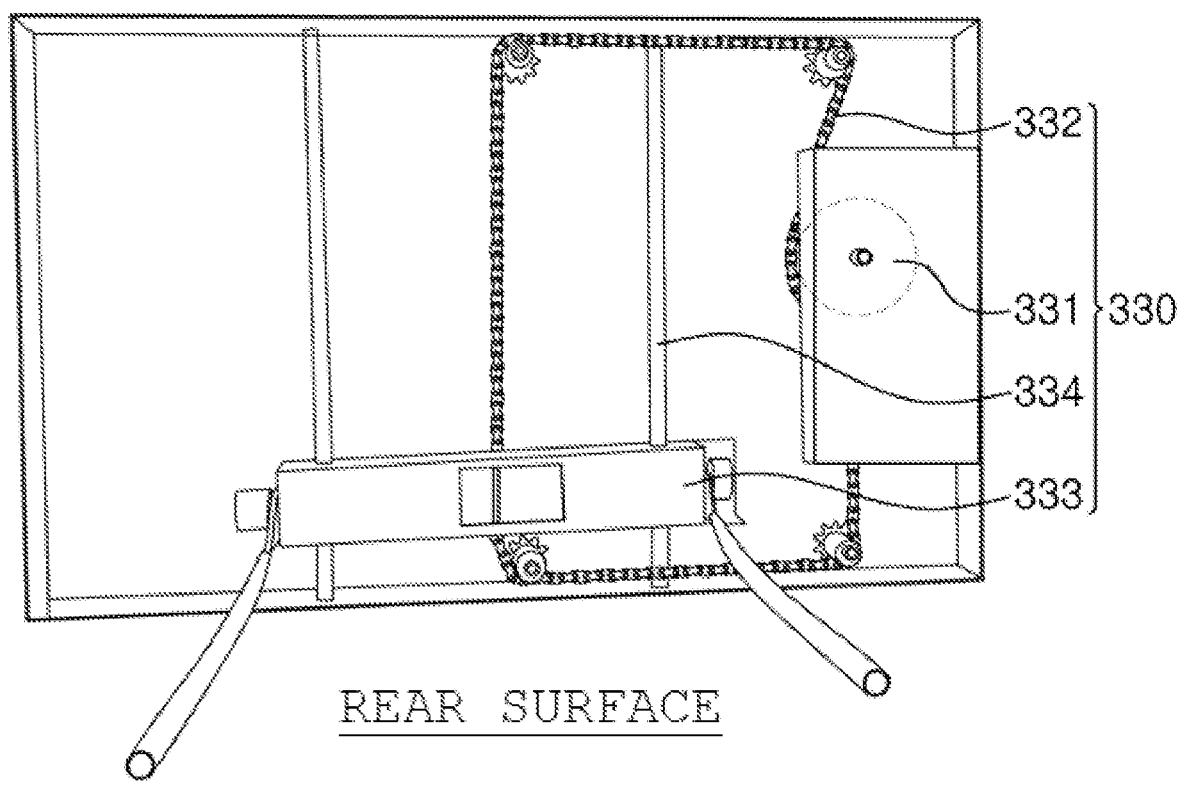

Furthermore, as shown in FIGS. 6 and 7, the chain sprocket module 330 formed on the rear surface of the transfer body 310 is vertically transferred by rotating the rotation handle 340 formed on the front surface of the transfer body 310.

In greater detail, when the rotation handle 340 is rotated, the main sprocket 331 is rotated and transfers the chain 332. In this case, a movement part 333 is provided on one side of the chain 332. Through guides 334 passing through the movement part 333 are formed such that the movement part 33 is moved only in the vertical direction.

In this case, small sprockets are formed around the main sprocket 331 to correct the position of the chain and maintain tension.

Accordingly, the charcoal plate 400 is positioned on the guide 320 of the vertical transfer part 300 so that the charcoal plate 400 can be transported vertically.

Figure 8:
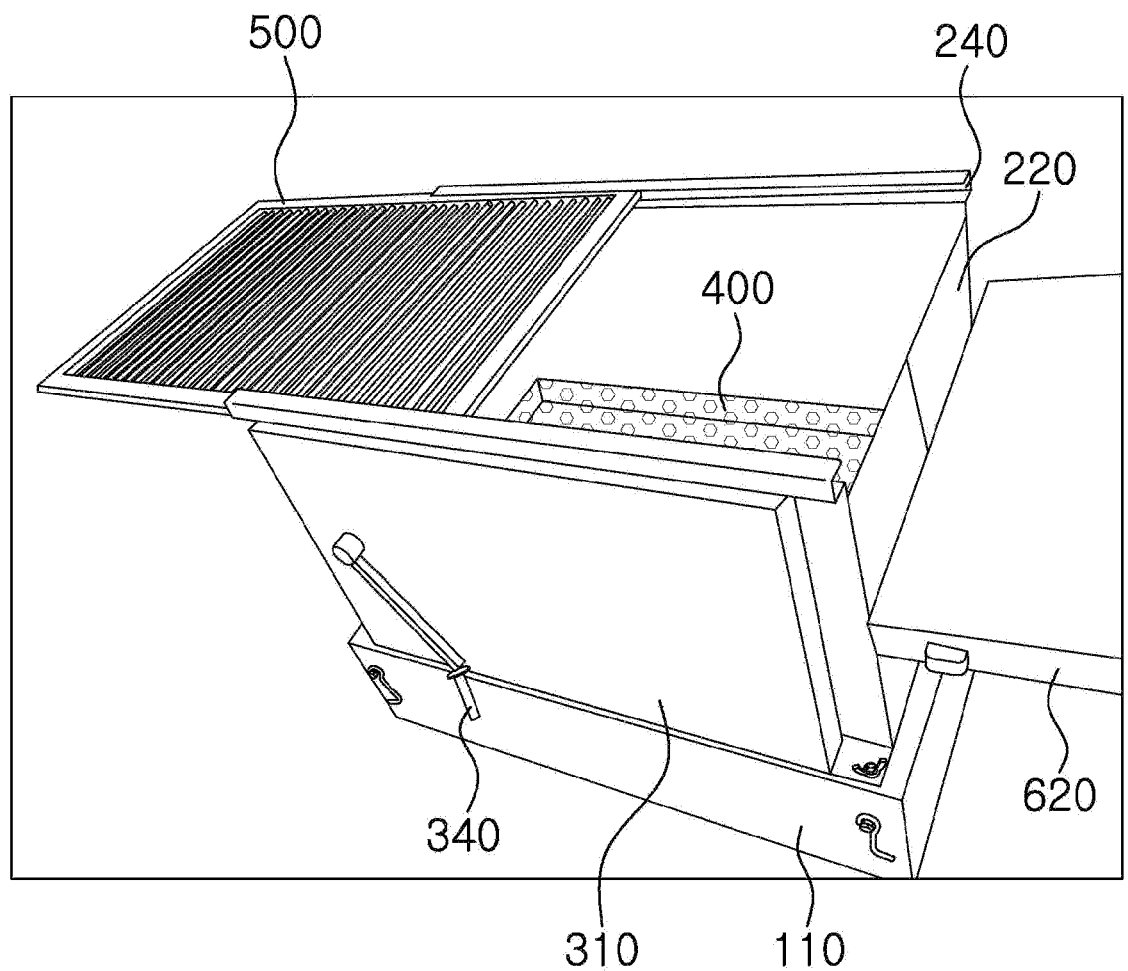
FIGS. 8 and 9 are views showing an example of an operation in which a grill according to the present invention is inserted into grill guide grooves.
Figure 9:
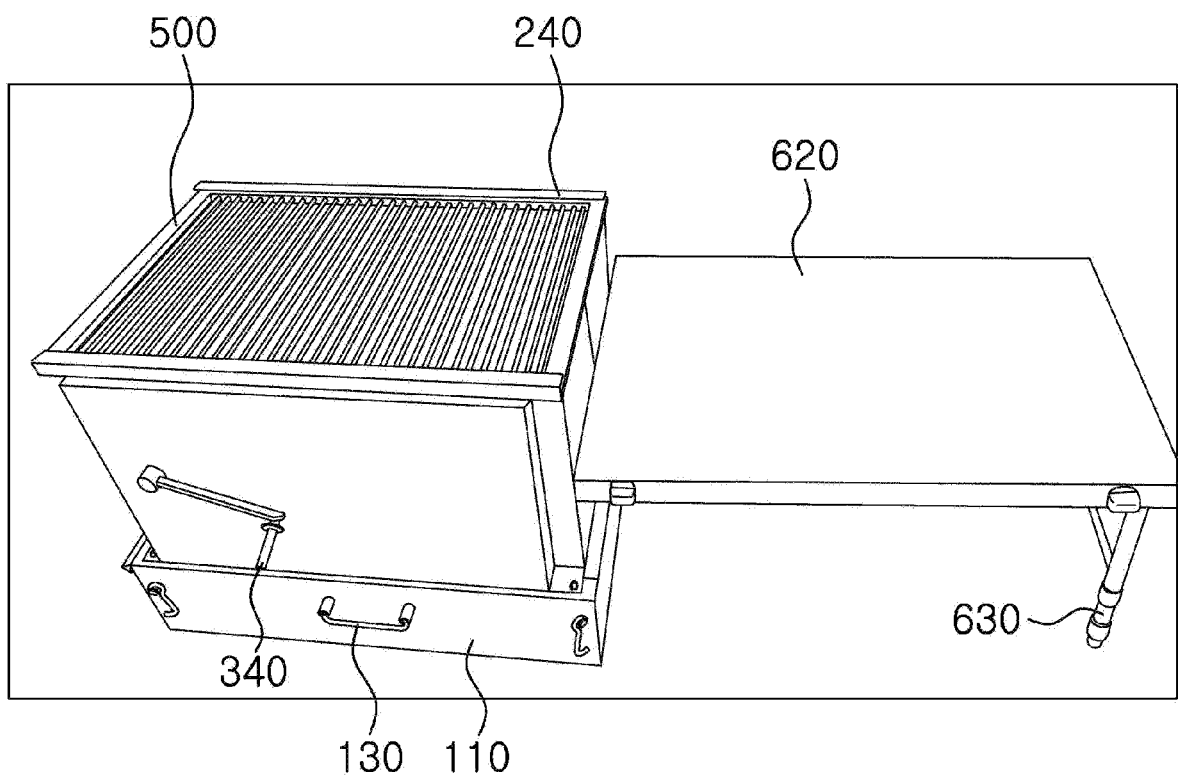

Accordingly, as shown in FIGS. 8 and 9, the grill 500 is inserted into the grill guide grooves 240 of the windshield 200 and transferred in a left-right direction.

In this case, the grill 500 is composed of hollow pipes so that meat can be grilled by the indirect heat of charcoal. In particular, a configuration may be made such that the grill 500 itself can be pulled out in one direction (in an outward direction) based on a charcoal container in a sliding structure so that meat is prevented from being burnt.

Figure 10:
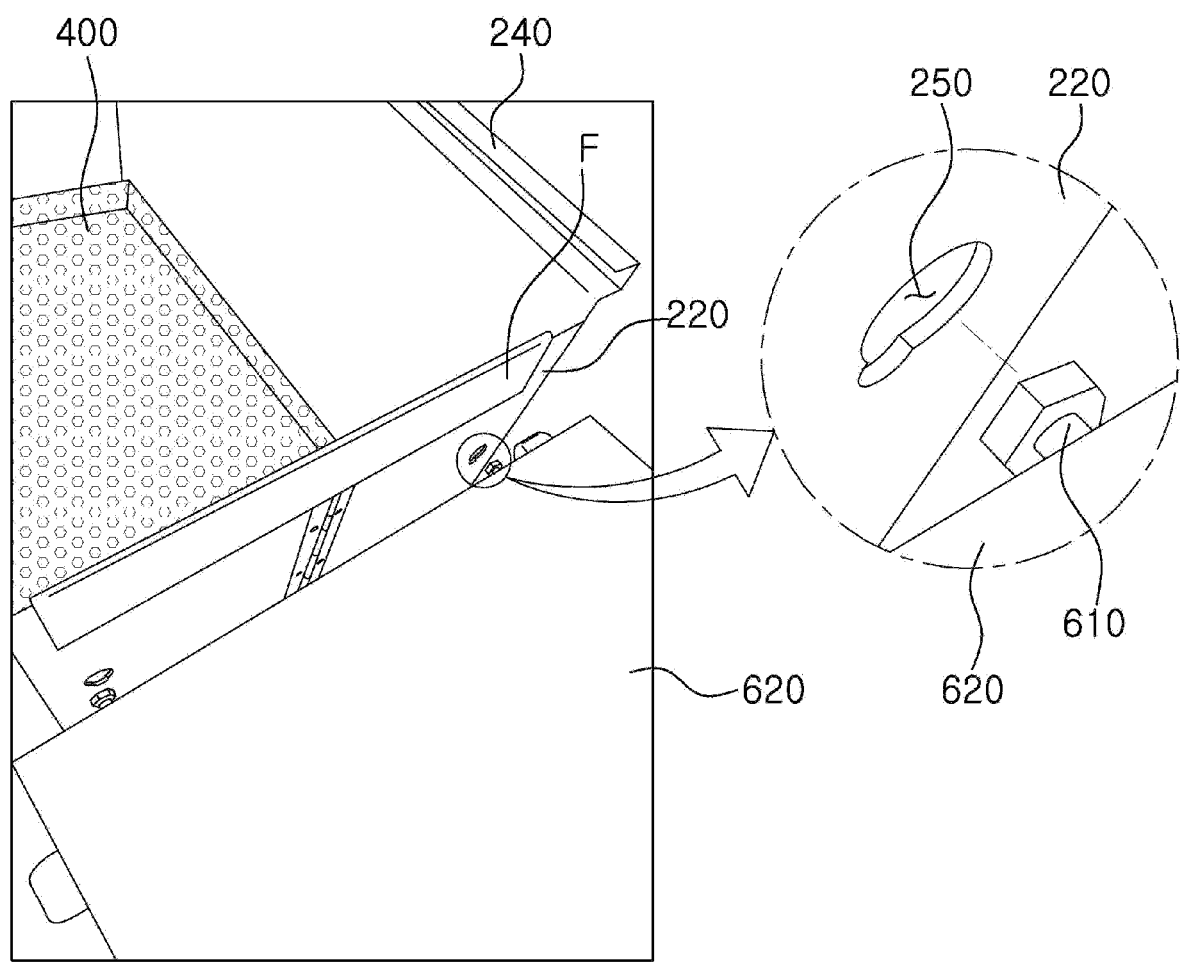
FIG. 10 is a view showing an example of an operation in which fasteners are coupled to fixing holes according to the present invention.

Accordingly, as shown in FIGS. 9 and 10, the cover 600 is provided with a cover body 620 having fasteners 610 on one side so that it can be fitted into the fixing holes 250 of the windshield 200. Folding legs 630 are formed on the bottom surface of the cover body 620.

In this case, the upper portion of each of the fixing holes 250 includes an inner hole 251 and a seating hole 252 formed below the inner hole. The seating hole 252 is formed to be smaller than the inner hole. The head of each of the bolt-shaped fasteners 610 is inserted into the inner hole, and the threaded portion of the fastener 610 is fixed by being seated in the seating hole 252.

In this case, the foldable legs 630 are formed in a telescopic manner, and the length thereof can be adjusted like climbing canes.

Figure 11:
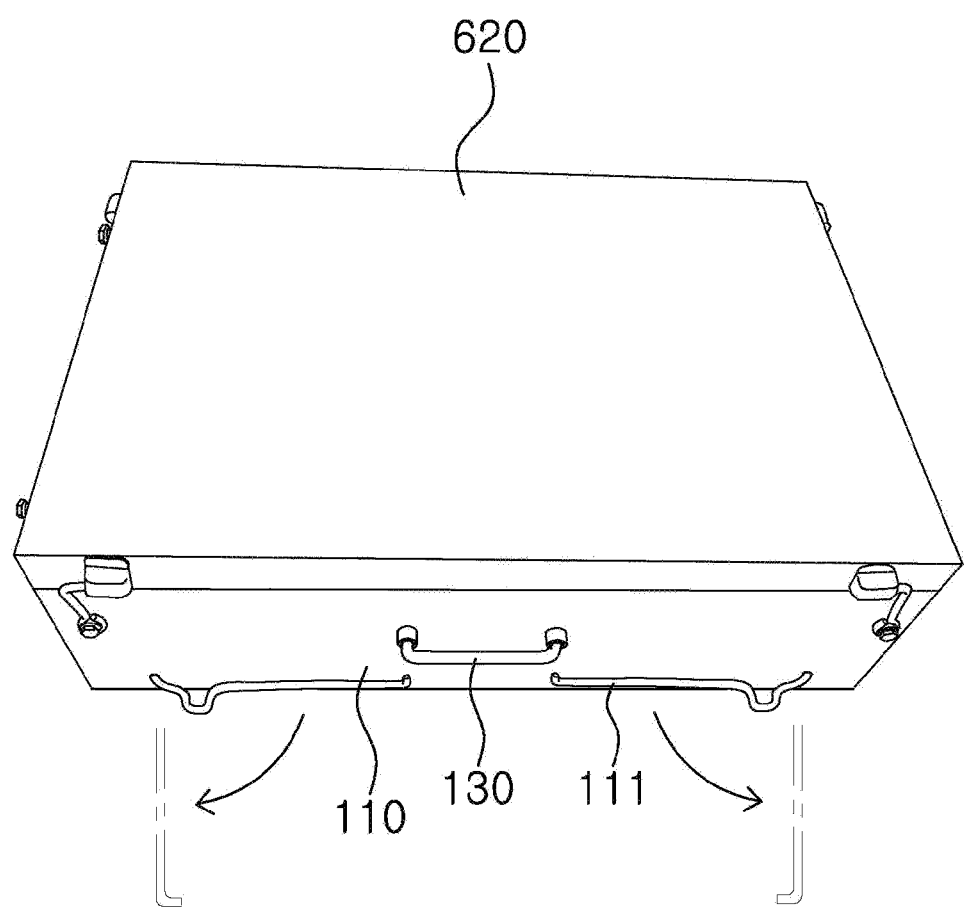
FIG. 11 is a view showing an example of a state in which a body according to the present invention is covered with a cover.
Figure 12:
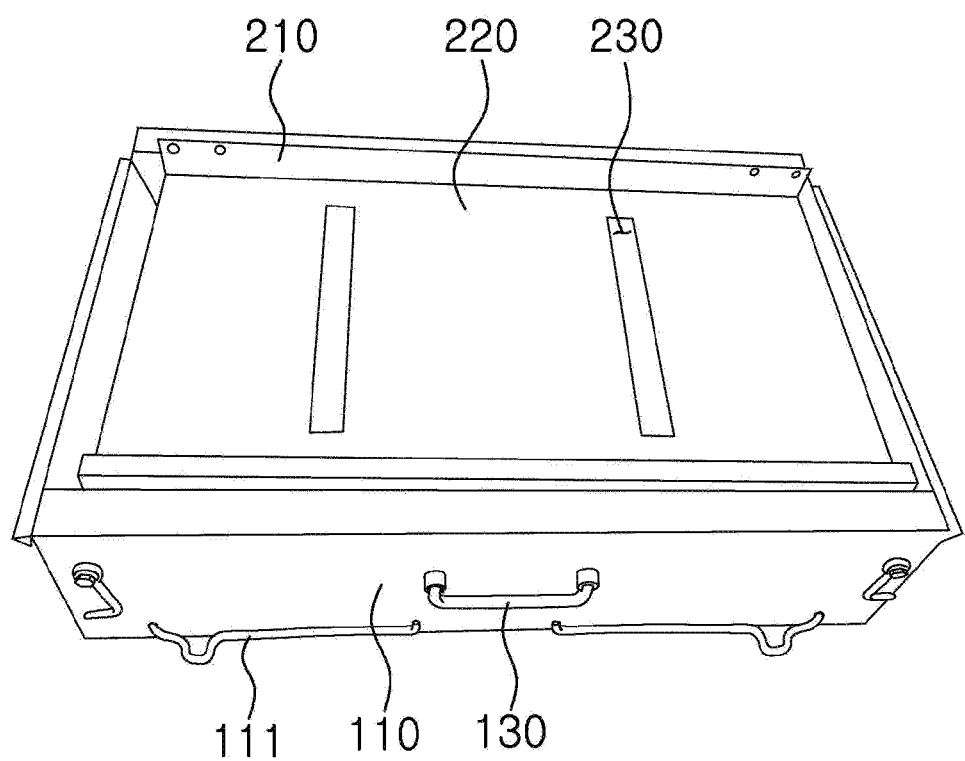
FIG. 12 is a view showing an example of a state in which a windshield, a vertical transfer part, a charcoal plate, and a grill are accommodated in a body according to the present invention.

Furthermore, as shown in FIGS. 11 and 12, auxiliary legs 111 that can be selectively folded and unfolded are disposed on the lower portion of the body portion 110 and allow the height of the body portion to be changed.

Accordingly, as shown in FIGS. 11 and 12, the windshield 200, the vertical transfer part 300, the charcoal plate 400, and the grill 500 are accommodated in the space portion S of the body portion 110 and are covered with the cover 600.

Accordingly, a connection ring is provided on one side of the body portion 110, and a fixing portion is provided on one side of the cover body 620 to allow the connection ring to be fixed thereto.

Figure 13:
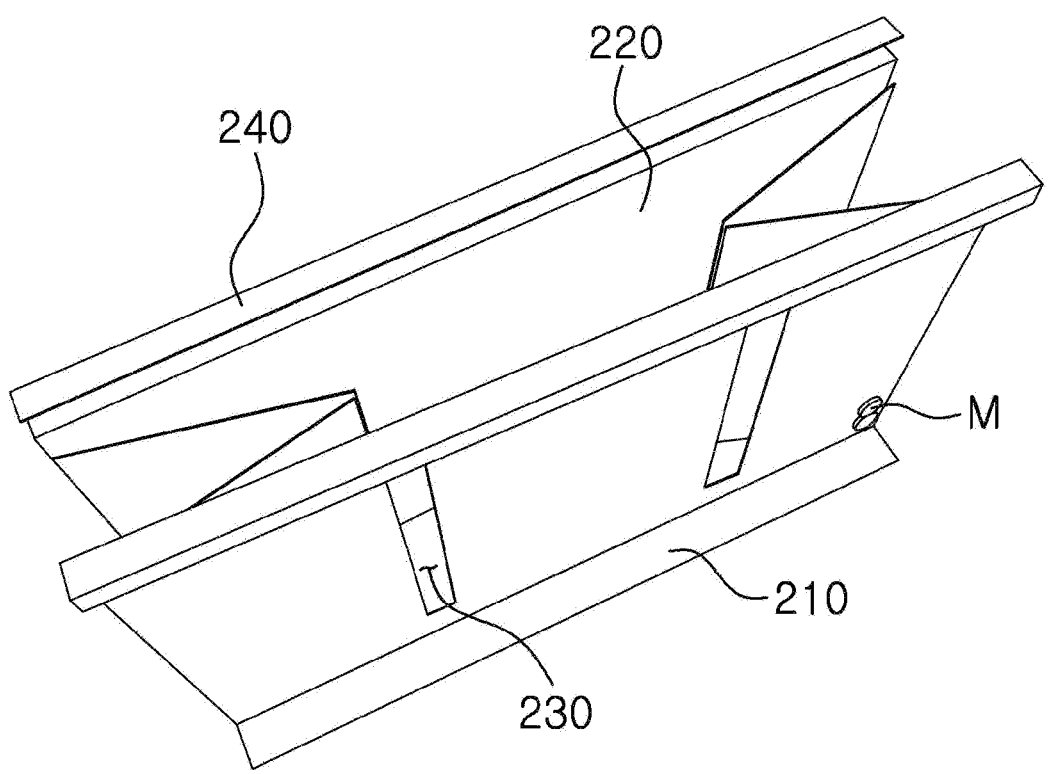
FIG. 13 is a view showing an example of a state in which a windshield is folded according to the present invention.

In addition, as shown in FIGS. 2 and 13, the folding body 220 is folded by the hinges provided in the folding body 220.

Figure 14:
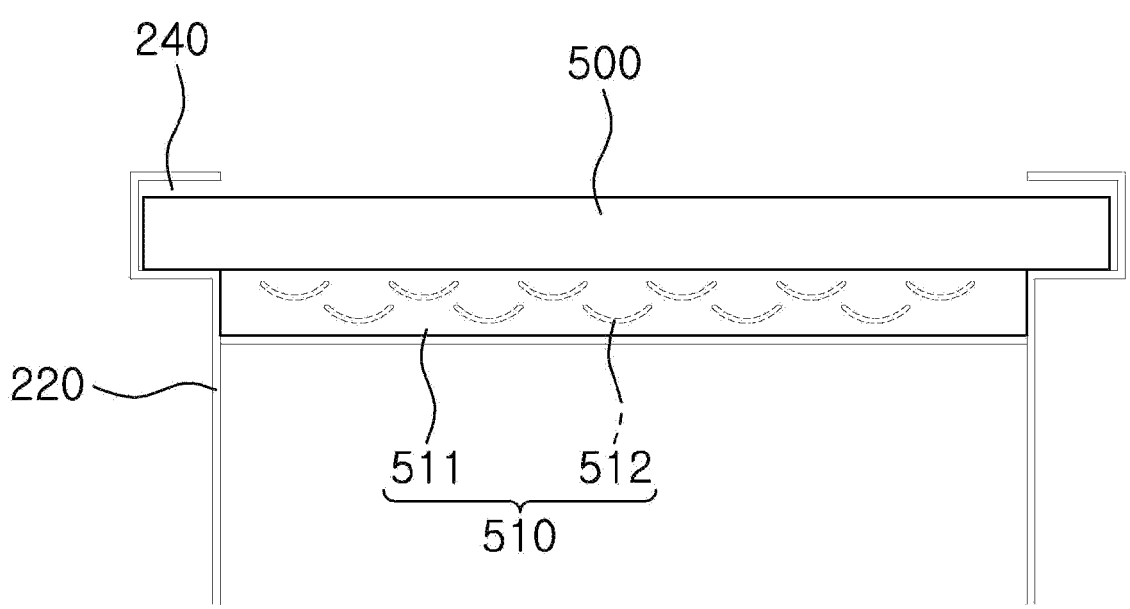
FIGS. 14 and 15 are views showing an example of a drip tray according to the present invention.
Figure 15:
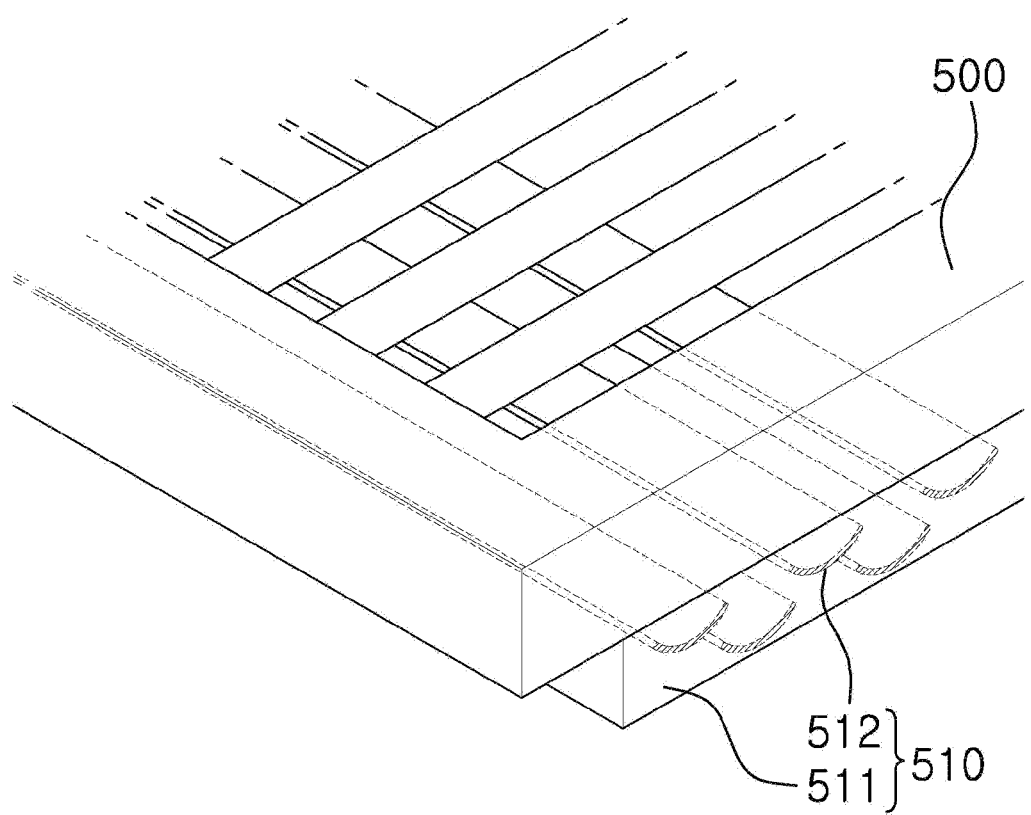

Accordingly, as shown in FIGS. 14 and 15, a drip tray 510 is disposed under the grill 500, and the drip tray 510 includes a frame 511 provided under the grill 500 and a plurality of concave reception members 512 provided inside the frame.

In greater detail, the frame 511 is formed under the grill 500. The concave reception members 512 are alternately arranged in two rows inside the frame, so that the oil falling from meat is received by the concave reception members 512 and oil falls into the frame when three concave reception members 512 are filled with oil.

Furthermore, a foil is formed on the body portion 110 so as to receive oil that has fallen from the concave reception members 512.

Figure 16:
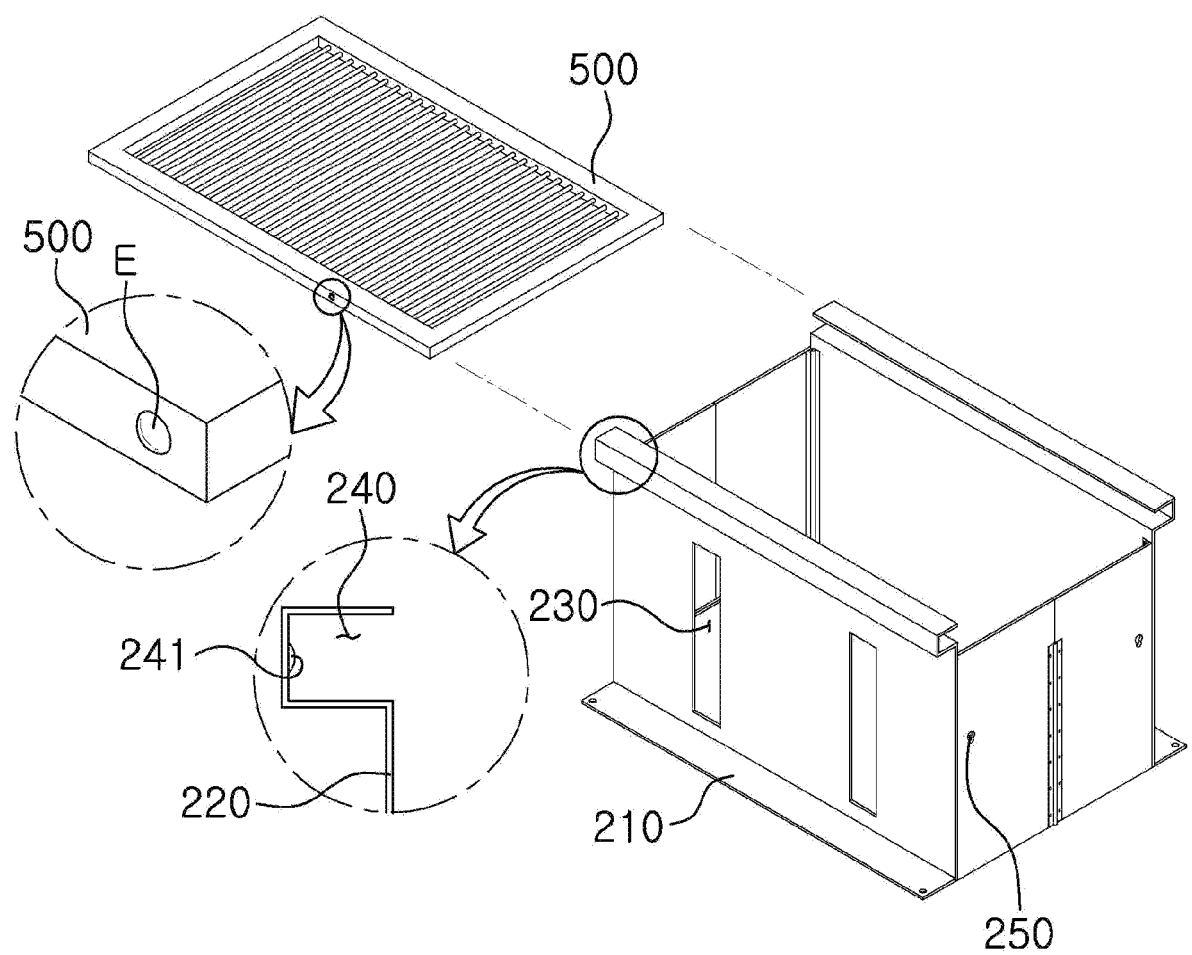
FIG. 16 is a view showing an example of removal prevention protrusions and protrusions according to the present invention.

Furthermore, as shown in FIG. 16, removal prevention protrusions 241 are formed on the sides of the insides of the grill guide grooves 240, and protrusions E corresponding to the removal prevention protrusions 241 are formed on the sides of the grill 500.

In greater detail, the grill 500 is inserted into the grill guide grooves 240 and the grill is removed from the grill guide grooves by ⅔ before meat is burned, thereby preventing the meat from being cooked anymore. In this case, the removal prevention protrusions 241 and the protrusions E come into contact with each other, and prevent the grill 500 from being separated from the grill guide grooves 240 regardless of a user's intention.

The present invention relates generally to a portable roaster used when outdoor cooking or camping is enjoyed, and more particularly to a portable roaster with improved portability and handleability, which can be transformed into a single briefcase form so that it is easy for the user to carry it, which can accommodate a windshield, a vertical transfer part, a charcoal plate, and a grill inside the body of the portable roaster so that meat can be grilled and eaten by, e.g., a barbecue grilling method outdoors through easy assembly, it is convenient to store portable roaster in a vehicle or warehouse, and the handling of the portable roaster is very convenient, and which allows a cover to be used as a substitute for a table so that the portable roaster is highly versatile.

In this case, in the present invention, the height of the charcoal plate may be adjusted to control heat, the folding prevention elements may be fitted to the windshield so that the windshield does not collapse, and the height of the charcoal plate may be stopped exactly at a desired position and maintained as it is unless it is pressed with a strong force, thereby ensuring stability.

Furthermore, the grill on which meat is placed is composed of hollow pipes so that the meat can be grilled with indirect heat. In particular, the grill itself is formed to be removed to the outside in one direction based on the charcoal plate, so that meat can be prevented from being burned.

In this case, the drip tray is placed under the grill when necessary, so that oil does not fall on charcoal, thereby preventing burnt or soot from occurring.

Accordingly, cleanup may be easily achieved by laying silver paper on the bottom of the body portion or by laying the re-collection plate or the drip tray.

Furthermore, after meat has been eaten, the portable roaster may be easily changed into a bag and stored on one side of a vehicle.

The present invention is not limited to the specific preferred embodiments described above, and any person of ordinary skill in the art to which the present invention pertains may implement various modifications without departing from the gist of the present invention claimed in the claims. It is obvious that such modifications will fall within the scope of the description of the claims.

What is claimed is:

1. A portable roaster with improved portability and handleability, the portable roaster comprising:
    a body configured such that a body portion having an open top and an inner space is formed therein, front end portions are provided at open ends of the body portion, and a handle is provided on one side of an outer surface of the body portion;
    a windshield configured such that front end members are provided on a bottom thereof so that the windshield is located on the front end portions of the body, a folding windshield body that is foldable by hinges is formed, vertical guide slits are formed in one side of the folding windshield body, grill guide grooves are formed on a top of the folding windshield body, and one or more fixing holes are formed in one side of the folding windshield body;
    a vertical transfer part configured such that a transfer body is disposed on the front end member of the windshield, one or more guides protrude from one side surface of the transfer body and are inserted into the vertical guide slits of the folding windshield body, a chain sprocket module configured to transfer the guides vertically is disposed on an inside of the transfer body, and the chain sprocket module is operated by a rotation handle provided on a side surface of the transfer body opposite the one side surface from which the guides protrude;
    a charcoal plate configured to be located on the guides of the vertical transfer part;
    a grill configured to be inserted into the grill guide grooves of the windshield and to be transferred a lateral direction; and
    a cover configured such that a cover body one side of which fasteners are formed to be fitted into the fixing holes of the windshield and folding legs are formed on a bottom surface of the cover body;
    wherein fixing screw portions protrude from surfaces of the front end portions, screw holes are formed in the front end members to receive the fixing screw portions and then the fixing screw portions are fastened in the screw holes by nuts, and a magnet is formed on one side of the windshield and then the nuts are attached thereto.

2. The portable roaster of claim 1, wherein a drip tray is disposed under the grill, and comprises a frame provided under the grill and a plurality of concave reception members provided inside the frame.

* * * * *